United States Patent [19]

Crowninshield et al.

[11] 4,175,446
[45] Nov. 27, 1979

[54] STEP COUNTING DEVICE AND METHOD

[75] Inventors: Roy D. Crowninshield; Andrew J. Branch, both of Iowa City, Iowa

[73] Assignee: The University of Iowa Research Foundation, Iowa City, Iowa

[21] Appl. No.: 900,216

[22] Filed: Apr. 26, 1978

[51] Int. Cl.² .................................................. G01C 22/00
[52] U.S. Cl. ......................................... 73/787; 73/172; 73/379; 235/92 K; 235/99 R; 235/105
[58] Field of Search .................. 73/91, 172, 379, 787; 128/2 S; 235/92 K, 99 R, 105

[56] References Cited
U.S. PATENT DOCUMENTS

| | | | |
|---|---|---|---|
| 3,272,003 | 9/1966 | Harting | 73/91 |
| 3,305,036 | 2/1967 | Walters | 73/172 |
| 3,974,491 | 8/1976 | Sipe | 128/2 S X |
| 4,019,030 | 4/1977 | Tanitz | 235/105 |
| 4,056,265 | 11/1977 | Ide | 235/99 R X |

*Primary Examiner*—Charles Gorenstein
*Attorney, Agent, or Firm*—Beveridge, DeGrandi, Kline & Lunsford

[57] ABSTRACT

The number of steps taken while walking are counted by straining a fatigue life gauge to change its electrical resistance each time the device is stepped on by a subject. The change in resistance of the fatigue life gauge is measured to ascertain the approximate number of steps taken.

10 Claims, 5 Drawing Figures

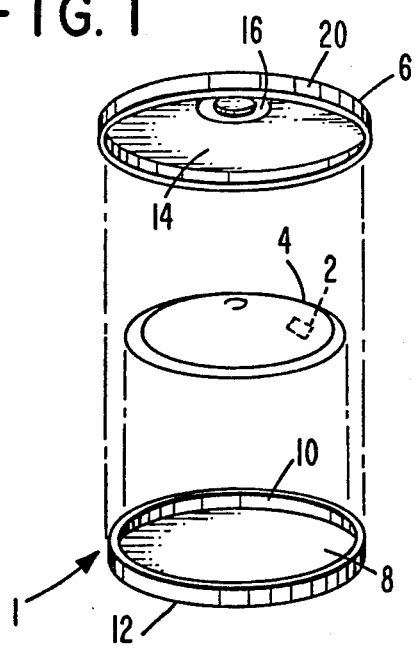
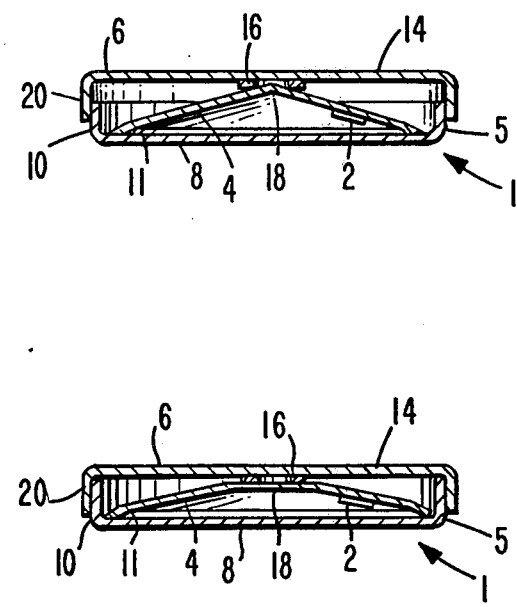
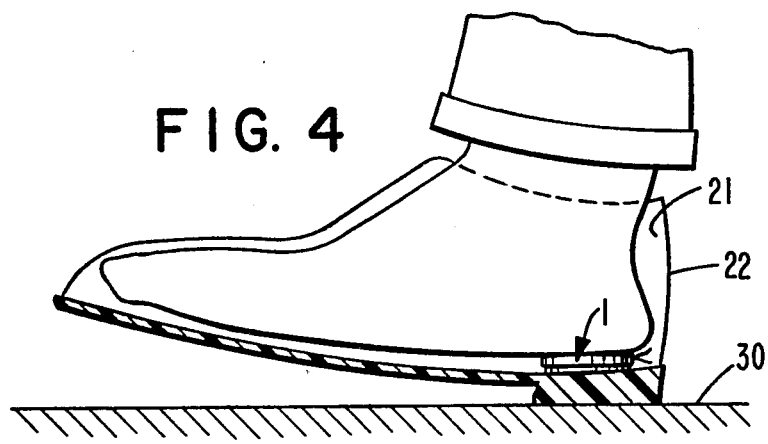
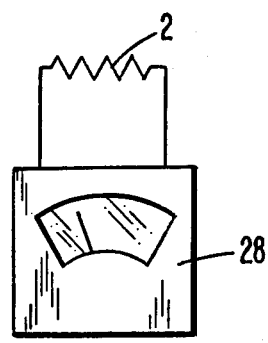

STEP COUNTING DEVICE AND METHOD

BACKGROUND OF THE INVENTION

The present invention relates to a device and method for determining the number of walking steps taken by a subject during a period of time.

Data derived from the use of this invention is useful for a wide variety of purposes, such as in estimating the lower extremity loading activity of subjects in the study of work environments, physical disabilities and medical treatment. The degree of disability and the success of treatment of a broad range of medical problems can be evaluated by the objective measurement of ambulatory activity. Ambulatory activity levels can provide an index of musculoskeletal, respiratory, and cardiac functions.

Step counting devices such as mileage measuring pedometers are known in the art but have several drawbacks which are overcome by the present invention. The most common of these prior devices is the mechanical pedometer worn on the torso to count steps in response to movements of the pedometer body. This appurtenance can be a nuisance and it is inaccurate when subjected to movements which are not due to actual steps being taken. For instance, such a pedometer may indicate that steps are being taken while the subject rides in an automobile on a bumpy road.

Electronic step counters have been developed which will precisely measure walking activity. The expense and sophistication of these devices and their associated readout apparatus limit their widespread use.

The present invention obviates these difficulties by allowing the number of steps taken by a subject to be counted unobtrusively, accurately, and at small expense. If the length of his stride is known this invention is operable as a distance measuring device by multiplying the number of steps taken on one foot by twice the stride length.

SUMMARY OF THE INVENTION

The present invention counts steps by straining and permanently changing the resistance of a fatigue life gauge every time the subject steps on the device.

Fatigue life gauges are presently used to count strain cycles on airplanes, automobiles and other mechanical structures. The fatigue life gauge is a small electrical circuit element, the resistance of which is permanently altered every time it is subjected to substantial strain. Thus by measuring and recording its resistance at one time, and by measuring and recording its resistance at a later time, the resistance change may be translated to the number of strains exerted on the fatigue life gauge. The following documents provide a good discussion of the operation of such gauges and are incorporated herein by reference:

Harding, D. R. "The —S/N— Fatigue Life Gauge: A Direct Means of Measuring Cumulative Fatigue Damage." *Experimental Mechanics* 6: 19A–24A, February, 1966.

Sheth, N. J. et. al., "Determination of Accumulated Structural Loads from S/N Gauge Resistance Measurements." International Automotive Engineering Congress, Detroit, Mich., Jan. 8–12, 1973, SAE reprint No. 730139.

Booth, C. W., "The —S/N— ® "Fatigue Life Gauge in Perspective," Micromeasurements, a Division of Vishay Intertechnology, Inc., Box 306, 38905 Chase Road, Romulus, Mich. 48174.

"—S/N— Fatigue Life Gauges," Product Bulletin PB-103-3, Micromeasurements, Vishay Intertechnology, Inc., P. O. Box 306, 38905 Chase Road, Romulus, Mich. 48174.

Dorsey, J. "Engineering Concepts in Fatigue Life Gauge Use," An-127-3, Micromeasurements, Division of Vishay Intertechnology, Inc., 38905 Chase Road, Romulus, Mich. 48174.

U.S. Pat. No. 3,272,003.

According to this invention, the number of steps taken by a subject are counted by a device including a fatigue life gauge bonded to a support member which is strained in response to each step taken thereon, whereby the number of steps taken by the subject may be ascertained by measuring the properties of the fatigue life gauge. The steps taken by a subject are counted by the method of subjecting a fatigue life gauge to strains when the subject steps, and measuring changes in the properties of the fatigue life gauge to ascertain the number of steps taken.

DESCRIPTION OF THE DRAWINGS

The preferred embodiment of the invention will be described in detail, below, with reference to the accompanying drawings, wherein:

FIG. 1 is an exploded view of the preferred embodiment of the invention;

FIG. 2 is a cross sectional view of the preferred embodiment of the invention taken through the greatest diameter of the embodiment; in an unstrained condition;

FIG. 3 is a cross section of the device of FIG. 2 when subjected to strain.

FIG. 4 is a cross section of a shoe worn by a wearer, embodying the present invention.

FIG. 5 is a block diagram of the measuring apparatus to be used in determining the values of the resistance of the fatigue life gauge.

DESCRIPTION OF THE PREFERRED EMBODIMENT

In the device 1 shown in FIGS. 1 to 3, a fatigue life gauge 2 is bonded to an area of a support member which is normally relaxed and is strained in response to steps taken on the device by the subject being evaluated. The preferred support member is resilient metallic concavo-convex buckling plate 4 which is enclosed in a housing 5 formed by an upper cup 6 and a lower cup 8. The lower cup 8 has an upstanding cylindrical sidewall 10 and a circular base 12 which supports the circular rim 11 of the buckling plate 4. The upper cup 6 has a circular base 14 provided with an internal ring 16 which centers the apex 18 of the slightly conical shaped buckling plate 4. The cup 6 also includes a depending cylindrical sidewall 20 within which sidewall 10 telescopically fits to permit relative vertical movement between the cups 6 and 8. The effective internal height of the chamber within housing 5 when collapsed is less than the height of buckling plate 4 so that the normal condition of the device will be as shown in FIG. 2, the edge of sidewall 10 being spaced from the circular base 14 of the upper cup 6. However, when compressive forces are applied to the device, the cups 6 and 8 will move together to the compressed relationship shown in FIG. 3. This causes the concavo-convex portion of plate 4 to snap over-center, changing from its relaxed state to its strained state, straining the gauge 2 to change its electrical resistance permanently. The extent of deformation and strain will be uniform each time the device is compressed, as the deformation will always be terminated by the stop means which includes the edge of sidewall 10 striking the circular base 14 of upper cup 6. When the compressive force is removed, the resilience and elastic memory of plate 4 will snap it back to the normal position shown in FIG. 2.

FIG. 4 shows the device 1 placed in the foot-receiving cavity 21 of a shoe 22 beneath the heel of the subject where it will be compressed when the subject takes a step. When the subject has his foot off the ground, the housing 5 will be in its normal condition shown in FIG. 2, with the cups 6 and 8 being in a spaced relationship. The buckling plate 4 and gauge 2 will be in a relaxed state. As the foot of the subject hits the ground 30 and the weight of the user exerts a force on cup 6, the housing 5 is compressed as cups 6 and 8 move to the position shown in FIG. 3 to deform the buckling plate 4. If the thickness and composition of buckling plate 4 are chosen so that it will be deformed as shown in FIG. 3 upon the application of a fraction of the user's body weight, then every step taken on the device will deform it an equal amount, exerting equal amounts of strain on the fatigue life gauge. This uniformity of the amount of strain on the fatigue life gauge allows for accurate approximations of the number of strains exerted during a period of time using known data.

Since the change in electrical resistance of the gauge 2 is indicative of the number of steps taken by the subject, the resistance of the gauge 2 is measured periodically by an ohmmeter 28 as shown in FIG. 5. The change in measured resistance of the gauge 2 is easily converted to strain cycles thereon which, in turn, is converted to units of steps or distance walked.

While a preferred embodiment of the invention has been disclosed, it will be evident that it is susceptible to numerous modifications. The support plate 4 may possess a wide variety of configurations, and the device may be inverted or relocated within the shoe, even to the extent that it may be within or project from the tread surface of the shoe. As further modifications and improvements are expected, it is emphasized that the invention is not limited to the disclosed embodiment but is embracing of a variety of devices and methods within the spirit of the following claims.

We claim:

1. Apparatus for counting the steps taken by a subject wearing said device comprising:
   (a) a shoe,
   (b) a support member mounted on said shoe, at a location which is subjected to compressive forces while walking,
   (c) a fatigue life gauge bonded to an area of the support member which is normally relaxed and is strained in response to steps taken on the device by the subject, whereby said fatigue life gauge is strained and the number of steps taken by said subject may be ascertained by measuring the properties of said fatigue life gauge.

2. Apparatus as claimed in claim 1 wherein said support member is a concavo-convex plate.

3. Apparatus as claimed in claim 1 having stop means for limiting the deformation of the support member when a step is taken on the device by a subject.

4. Apparatus as claimed in claim 1 wherein the support member is resilient and has a concavo-convex portion causing it to snap over-center when changing from its relaxed state to its strained state.

5. Apparatus as claimed in claim 4 having stop means for limiting the deformation of the support member when a step is taken on the device by a subject.

6. A device for counting the steps taken by a subject wearing said device comprising:
   (a) a support member,
   (b) a fatigue life gauge bonded to an area of the support member which is normally relaxed and is strained in response to steps taken on the device by the subject, whereby said fatigue life gauge is strained and the number of steps taken by the subject may be ascertained by measuring the properties of said fatigue life gauge,
   (c) stop means for limiting the deformation of the support member when a step is taken on the device by a subject.

7. A device as claimed in claim 6 wherein the support member is resilient and has a concavo-convex portion causing it to snap over-center when changing from its relaxed state to its strained state.

8. A device as claimed in claim 6 wherein the support member is resilient and has a concavo-convex portion causing it to snap over-center when changing from its relaxed state to its strained state.

9. A device for counting the steps taken by a subject wearing said device comprising:
   (a) a support member,
   (b) a fatigue life gauge bonded to an area of the support member which is normally relaxed and is strained in response to steps taken on the device by the subject, whereby said fatigue life gauge is strained and the number of steps taken by said subject may be ascertained by measuring the properties of said fatigue life gauge,
   (c) a housing enclosing said support member, said housing including oppositely facing first and second cups, each of said cups having a circular base and a cylindrical sidewall, said sidewalls being telescopically related to permit relative linear movement between said bases.

10. A method for counting steps taken by a subject comprising,
    (a) subjecting a fatigue life gauge to strains when said subject takes a step, and
    (b) measuring changes in properties of said fatigue life gauge to ascertain the number of steps taken.

* * * * *